(12) United States Patent
Chester et al.

(10) Patent No.: US 8,180,055 B2
(45) Date of Patent: *May 15, 2012

(54) CRYPTOGRAPHIC SYSTEM INCORPORATING A DIGITALLY GENERATED CHAOTIC NUMERICAL SEQUENCE

(75) Inventors: David B. Chester, Palm Bay, FL (US); Alan J. Michaels, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 838 days.

This patent is subject to a terminal disclaimer.

(21) Appl. No.: 12/026,217

(22) Filed: Feb. 5, 2008

(65) Prior Publication Data

US 2009/0196420 A1 Aug. 6, 2009

(51) Int. Cl.
*H04L 9/00* (2006.01)
(52) U.S. Cl. ..................................................... 380/263
(58) Field of Classification Search .................. 380/263
See application file for complete search history.

(56) References Cited

U.S. PATENT DOCUMENTS

| | | | |
|---|---|---|---|
| 3,564,223 A | 2/1971 | Harris et al. | |
| 4,095,778 A | 6/1978 | Wing | |
| 4,646,326 A | 2/1987 | Backof, Jr. et al. | |
| 4,703,507 A | 10/1987 | Holden | |
| 5,007,087 A * | 4/1991 | Bernstein et al. | 380/46 |
| 5,048,086 A * | 9/1991 | Bianco et al. | 380/28 |
| 5,077,793 A * | 12/1991 | Falk et al. | 380/28 |
| 5,276,633 A | 1/1994 | Fox et al. | |
| 5,297,153 A | 3/1994 | Baggen et al. | |
| 5,297,206 A | 3/1994 | Orton | |
| 5,319,735 A | 6/1994 | Preuss et al. | |
| 5,412,687 A | 5/1995 | Sutton et al. | |
| 5,598,476 A | 1/1997 | LaBarre et al. | |
| 5,646,997 A | 7/1997 | Barton | |

(Continued)

FOREIGN PATENT DOCUMENTS

EP 0 849 664 A2 6/1998

(Continued)

OTHER PUBLICATIONS

Chren Jr., William A, PN Code Generator with Low Delay-Power Product for Spread-Spectrum Systems, IEEE Transactions on Circuits & Signal Processing (1057-7130), Dec. 1, 1999, vol. 46, Iss. 12;p. 1506-1511.*

(Continued)

*Primary Examiner* — Philip Chea
*Assistant Examiner* — Feliciano Mejia
(74) *Attorney, Agent, or Firm* — Fox Rothschild, LLP; Robert J. Sacco

(57) ABSTRACT

A cryptographic system (CS) is provided. The CS (500) is comprised of a data stream receiving device (DSRD), a chaotic sequence generator (CSG) and an encryptor. The DSRD (602) is configured to receive an input data stream. The CSG (300) includes a computing means ($302_0, \ldots, 302_{N-1}$) and a mapping means (304). The computing means is configured to use RNS arithmetic operations to respectively determine solutions for polynomial equations. The solutions are iteratively computed and expressed as RNS residue values. The mapping means is configured to determine a series of digits in the weighted number system based on the RNS residue values. The encryptor is coupled to the DSRD and CSG. The encryptor is configured to generate a modified data stream by incorporating or combining the series of digits with the input data stream.

25 Claims, 7 Drawing Sheets

U.S. PATENT DOCUMENTS

| | | |
|---|---|---|
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,924,980 A | 7/1999 | Coetzee |
| 5,937,000 A | 8/1999 | Lee et al. |
| 6,014,446 A | 1/2000 | Finkelstein |
| 6,023,612 A | 2/2000 | Harris et al. |
| 6,038,317 A | 3/2000 | Magliveras et al. |
| 6,078,611 A | 6/2000 | La Rosa et al. |
| 6,141,786 A | 10/2000 | Cox et al. |
| 6,304,216 B1 | 10/2001 | Gronemeyer |
| 6,304,556 B1 | 10/2001 | Haas |
| 6,314,187 B1 | 11/2001 | Menkhoff et al. |
| 6,331,974 B1 | 12/2001 | Yang et al. |
| 6,377,782 B1 | 4/2002 | Bishop et al. |
| 6,570,909 B1 | 5/2003 | Kansakoski et al. |
| 6,614,914 B1 | 9/2003 | Rhoads et al. |
| 6,665,692 B1 | 12/2003 | Nieminen |
| 6,732,127 B2 | 5/2004 | Karp |
| 6,744,893 B1 | 6/2004 | Fleming-Dahl |
| 6,754,251 B1 | 6/2004 | Sriram et al. |
| 6,766,345 B2 | 7/2004 | Stein et al. |
| 6,842,479 B2 | 1/2005 | Bottomley |
| 6,980,656 B1 | 12/2005 | Hinton, Sr. et al. |
| 6,986,054 B2 | 1/2006 | Kaminaga et al. |
| 6,993,016 B1 | 1/2006 | Liva et al. |
| 7,023,323 B1 | 4/2006 | Nysen |
| 7,027,598 B1 | 4/2006 | Stojancic et al. |
| 7,069,492 B2 | 6/2006 | Piret et al. |
| 7,076,065 B2 | 7/2006 | Sherman et al. |
| 7,078,981 B2 | 7/2006 | Farag |
| 7,079,651 B2 | 7/2006 | Den Boer et al. |
| 7,095,778 B2 | 8/2006 | Okubo et al. |
| 7,133,522 B2* | 11/2006 | Lambert .................. 380/28 |
| 7,170,997 B2* | 1/2007 | Petersen et al. ......... 380/268 |
| 7,190,681 B1 | 3/2007 | Wu |
| 7,200,225 B1 | 4/2007 | Schroeppel |
| 7,233,969 B2 | 6/2007 | Rawlins et al. |
| 7,233,970 B2 | 6/2007 | North et al. |
| 7,245,723 B2 | 7/2007 | Hinton, Sr. et al. |
| 7,269,198 B1 | 9/2007 | Elliott et al. |
| 7,269,258 B2* | 9/2007 | Ishihara et al. ......... 380/263 |
| 7,272,168 B2 | 9/2007 | Akopian |
| 7,277,540 B1* | 10/2007 | Shiba et al. .............. 380/28 |
| 7,529,292 B2 | 5/2009 | Bultan et al. |
| 7,643,537 B1 | 1/2010 | Giallorenzi et al. |
| 7,779,060 B2 | 8/2010 | Kocarev et al. |
| 7,830,214 B2 | 11/2010 | Han et al. |
| 7,853,014 B2* | 12/2010 | Blakley et al. ........... 380/28 |
| 7,974,146 B2 | 7/2011 | Barkley |
| 2002/0012403 A1 | 1/2002 | McGowan et al. |
| 2002/0034191 A1 | 3/2002 | Shattil |
| 2002/0099746 A1 | 7/2002 | Tie et al. |
| 2002/0174152 A1 | 11/2002 | Terasawa et al. |
| 2002/0186750 A1 | 12/2002 | Callaway et al. |
| 2003/0016691 A1 | 1/2003 | Cho |
| 2003/0044004 A1 | 3/2003 | Blakley et al. |
| 2004/0001556 A1 | 1/2004 | Harrison et al. |
| 2004/0059767 A1 | 3/2004 | Liardet |
| 2004/0092291 A1 | 5/2004 | Legnain et al. |
| 2004/0146095 A1 | 7/2004 | Umeno et al. |
| 2004/0156427 A1 | 8/2004 | Gilhousen et al. |
| 2004/0196212 A1 | 10/2004 | Shimizu |
| 2005/0031120 A1 | 2/2005 | Samid |
| 2005/0050121 A1 | 3/2005 | Klein et al. |
| 2005/0089169 A1* | 4/2005 | Kim et al. ............... 380/263 |
| 2005/0207574 A1 | 9/2005 | Pitz et al. |
| 2005/0259723 A1 | 11/2005 | Blanchard |
| 2005/0274807 A1 | 12/2005 | Barrus et al. |
| 2006/0072754 A1 | 4/2006 | Hinton et al. |
| 2006/0093136 A1 | 5/2006 | Zhang et al. |
| 2006/0123325 A1 | 6/2006 | Wilson et al. |
| 2006/0209926 A1 | 9/2006 | Umeno et al. |
| 2006/0209932 A1 | 9/2006 | Khandekar et al. |
| 2006/0251250 A1 | 11/2006 | Ruggiero et al. |
| 2007/0121945 A1 | 5/2007 | Han et al. |
| 2007/0230701 A1 | 10/2007 | Park et al. |
| 2008/0008320 A1 | 1/2008 | Hinton et al. |
| 2008/0016431 A1 | 1/2008 | Lablans |
| 2008/0095215 A1 | 4/2008 | McDermott et al. |
| 2008/0198832 A1 | 8/2008 | Chester |
| 2008/0263119 A1 | 10/2008 | Chester et al. |
| 2008/0294707 A1 | 11/2008 | Suzuki et al. |
| 2008/0294710 A1 | 11/2008 | Michaels |
| 2008/0294956 A1 | 11/2008 | Chester et al. |
| 2008/0304553 A1 | 12/2008 | Zhao et al. |
| 2008/0304666 A1 | 12/2008 | Chester et al. |
| 2008/0307022 A1 | 12/2008 | Michaels et al. |
| 2008/0307024 A1 | 12/2008 | Michaels et al. |
| 2009/0034727 A1 | 2/2009 | Chester et al. |
| 2009/0044080 A1 | 2/2009 | Michaels et al. |
| 2009/0059882 A1 | 3/2009 | Hwang et al. |
| 2009/0110197 A1 | 4/2009 | Michaels |
| 2009/0122926 A1 | 5/2009 | Azenkot et al. |
| 2009/0196420 A1 | 8/2009 | Chester et al. |
| 2009/0202067 A1 | 8/2009 | Michaels et al. |
| 2009/0245327 A1 | 10/2009 | Michaels |
| 2009/0279688 A1 | 11/2009 | Michaels et al. |
| 2009/0279690 A1 | 11/2009 | Michaels et al. |
| 2009/0296860 A1 | 12/2009 | Chester et al. |
| 2009/0300088 A1 | 12/2009 | Michaels et al. |
| 2009/0309984 A1 | 12/2009 | Bourgain et al. |
| 2009/0310650 A1 | 12/2009 | Chester et al. |
| 2009/0316679 A1 | 12/2009 | Van Der Wateren |
| 2009/0323766 A1 | 12/2009 | Wang et al. |
| 2009/0327387 A1 | 12/2009 | Michaels et al. |
| 2010/0054225 A1 | 3/2010 | Hadef et al. |
| 2010/0111296 A1 | 5/2010 | Brown et al. |
| 2010/0254430 A1 | 10/2010 | Lee et al. |

FOREIGN PATENT DOCUMENTS

| | | |
|---|---|---|
| EP | 0 949 563 | 10/1999 |
| EP | 2 000 900 | 12/2008 |
| EP | 2 000 902 A2 | 12/2008 |
| GB | 1167272 A | 10/1969 |
| JP | 2004279784 A | 10/2004 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Boyar, Joan, Inferring Sequences Produced by Pseudo-Random Number Generators, Journal of the ACM (0004-5411), 1989. vol. 36, Iss. 1; p. 129-141.*

Taylor, F.J.; "Residue Arithmetic a Tutorial with Examples", Computer, vol. 17, No. 5, pp. 50-62, May 1984, doi: 10.1109/MC.1984.1659138.*

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004, XPOO2558039.

Manikandan, et al, "A Novel Pulse Based Ultrawide Band System Using Chaotic Spreading Sequences" Communication Systems Software and Middleware, 2007. Comsware 2007. 2nd International Conference on, IEEE, PI, Jan. 1, 2007, pp. 1-5, XP031113946 ISBN: 978-1-4244-0613-5; p. 1, p. 5.

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Kolumban, et al., "Chaotic Communications with Correlator Receivers: Theory and Performance Limits" Proceedings of the IEEE, vol. 90, No. 5, May 2002.

Michaels, et al., U.S. Appl. No. 12/056,024, filed Mar. 26, 2008, entitled "Selective Noise Cancellation of a Spread Spectrum Signal".

Michaels, et al., U.S. Appl. No. 12/117,086, filed May 8, 2008, Entitled "Cryptographic System Including a Mixed Radix Number Generator With Chosen Statistical Artifacts".

Chester, et al., U.S. Appl. No. 12/116,104, filed May 6, 2008, Entitled, "A Closed Galois Field Cryptographic System".

Chester, et al., U.S. Appl. No. 12/131,386, filed Jun. 2, 2008, Entitled "Adaptive Correlation".

Chester, et al., U.S. Appl.No. 12/137,593, filed Jun. 12, 2008, entitled "Featureless Coherent Chaotic Amplitude Modulation".

Michaels, et al., U.S. Appl. No. 12/129,197, filed May 29, 2008, entitled "Digital Generation of an Accelerated or Decelerated Chaotic Numerical Sequence".

Michaels, et al., U.S. Appl. No. 12/129,654, filed May 29, 2008, entitled "Sine/Cosine Generator".

Michaels, et al., U.S. Appl. No. 12/496,214, filed Jul. 1, 2009, entitled "Anti-Jam Communications Having Selectively Variable Papr Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "AD-HOC Network Acquisition Using Chaotic Sequence Spread Waveform".

Michaels, Alan, U.S. Appl. No. 12/201,021, filed Aug. 29, 2008, entitled, "Multi-Tier Ad-Hoc Network Communications".

Aparicio; "Communications Systems Based on Chaos" May 2007. Universidad Rey Juan Carlos.

Bererber, S.M., et al., "Design of a CDMA Sysetm in FPGA Technology", Vehicular Technology Conference, 2007. VTC2007-Spring. IEEE $65^{th}$ Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

EL-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. _1-1_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002,Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld—AWolfram Web Resource [online] [retrieved on Nov. 8, 2010] Retrieved from the Internet: <http://mathworld.wolfram.com/surjection.html>.

Weisstein, E., Surejection:, From MathWorld—AWolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

Socek, D., et al., Short Paper: Enhanced 1-D Chaotic Key Based Algorithm for Image Encryption, Sep. 2005, IEEE.

David Chester et al., U.S. Appl. No. 11/737,459, entitled "Digital Generation of a Chaotic Numerical Sequence," filed Apr. 19, 2007.

David Chester et al., U.S. Appl. No. 11/759,273, entitled "Spread Spectrum Communications System and Method Utilizing Chaotic Sequence," filed Jun. 7, 2007.

David Chester et al., U.S. Appl. No. 11/832,160, entitled Chaotic Spread Spectrum Communications System Receiver, filed Aug. 1, 2007.

Vanwiggeren, et al., "Chaotic Communication Using Time-Delayed Optical Systems," International Journal of Bifurcation and Chaos, vol. 9, No. 11, (1999) pp. 2129-2156, World Scientific Publishing Co.

Morsche, et al., "Signals and Systems," lecture notes, University of Eindhoven, The Netherlands, 1999.

Barile, Margherita, "Bijective," From MathWorld—A Wolfram Web Resource, created by Eric W. Weisstein. http://mathworld.wolfram.com/Bijective.html, Pub. Date May 29, 2007.

Weisstein, Eric W., "Injection," From MathWorld—A Wolfram Web Resource. http://mathworld.wolfram.com/Injection.html, Pub. Date May 29, 2007.

Weisstein, Eric W. "Surjection," From MathWorld—A Wolfram Web Resource, http://mathworld.wolfram.com/Surjection.html, Pub. Date May 29, 2007.

Yen, et al., (1999) "Residual Number System Assisted CDMA: A New System Concept", In: ACTS'99, Jun. 8-11, 1999, Sorrento, Italy.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Abel, et al., "Chaos Communications—Principles, Schemes, and System Analysis" Proceedings for the IEEE, IEEE. New York, NY. vol. 90, No. 5, May 1, 2002, XP011064997, ISSN: 0018-9219.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Barda, A; et al., "Chaotic signals for multiple access communications," Electrical and Electronics Engineers in Israel, 1995, Eighteenth Convention of, vol., No., pp. 2.1.3/1-2.1/3/5, Mar. 7-8, 1995.

Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.

International Search Report mailed Dec. 30, 2011, European Patent Application No. 11001222.6, in the name of Harris Corporation.

Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.

Pirkin, Llya, Calculations in Galois Fields., C/C++ Users Journal; Oct. 2004, vol. 22 Issue 10, p. 14-18, 4p, 1 Color Photograph.

Popescu, Angel, A Galois Theory for the Field Extension K ((X))/K., Glasgow Mathematical Journal; Sep. 2010, vol. 52 Issue 3, p. 447-451, 5p.

Pirkin, Ilya, Calculations in Galois Fields., C/C++ Users Journal; Oct. 2004, vol. 22 Issue 10, p. 14-18, 4p, 1 Color Photograph.

Diaz-Toca, G.M. and Lombardi, H. , Dynamic Galois Theory., Journal of Symbolic Computation; Dec. 2010, vol. 45 Issue 12, p. 1316-1329, 14p.

* cited by examiner

CRYPTOGRAPHIC SYSTEM INCORPORATING A DIGITALLY GENERATED CHAOTIC NUMERICAL SEQUENCE

BACKGROUND OF THE INVENTION

1. Statement of the Technical Field

The invention concerns cryptographic systems. More particularly, the invention concerns cryptographic systems implementing a method for digitally generating a chaotic numerical sequence.

2. Description of the Related Art

Chaotic systems can generally be thought of as systems which vary unpredictably due to the defining characteristics of: sensitivity to initial conditions; being mathematically dense; and being topologically transitive. The characteristics of denseness and topological transitivity loosely mean that the resultant numerical values generated by a chaotic circuit do not clump together, yet take every feasible value in the range. Chaotic systems are also distinguished by a sensitive dependence on a set of initial conditions and by having an evolution through time and space that appears to be quite random. When measured or observed, chaotic systems do not reveal any discernible regularity or order. However, despite its "random" appearance, chaos is a strictly deterministic evolution.

There are many types of chaotic cryptographic systems known in the art. Such chaotic cryptographic systems include a chaotic based encryption system and a chaotic based decryption system. Chaotic cryptographic systems offer promise for being the basis of a next generation of secure waveforms, providing low probability of Exploitation (LPE). Chaotic systems are typically comprised of analog circuits implementing chaos generators. Cryptographic systems are typically based on pseudo-random number generators driving mappings in finite algebraic structures.

Chaos generators have been conventionally constructed using analog chaotic circuits. The reason for reliance on analog circuits for this task has been the widely held conventional belief that efficient digital generation of chaos is impossible due to the inherent sensitivity to initial conditions dictating impractical wordwidths. Notwithstanding the apparent necessity of using analog type chaos generators, that approach has not been without problems. For example, analog chaos generator circuits are known to drift over time. The term "drift" as used herein refers to a slow variation in one or more parameters of a chaotic signal.

Prior art cryptographic systems may use multiple pseudo-random number generators to generate exceedingly complex pseudo-random sequences. However, such cryptographic systems only produce more complex pseudo-random number sequences that still possess even more complex pseudo-random statistical artifacts and no true chaotic properties. The sequences become more difficult to unravel and near impossible to exploit as the mappings become more complex. While certain polynomials can mimic chaotic behavior, the arithmetic precision required to generate chaotic number sequences required an impractical implementation. Stated differently, the binary arithmetic necessary in order to achieve digital chaos was prohibitive.

In view of the forgoing, there is a need for a chaotic cryptographic system configured to generate a sequence having chaotic properties. There is also a need for a method for digitally generating a chaotic number sequence that can be used in a variety of cryptographic system applications.

SUMMARY OF THE INVENTION

A cryptographic system is provided that has a data stream receiving device (DSRD), a first chaotic sequence generator and an encryptor. The DSRD is configured to receive an input data stream. The first chaotic sequence generator is comprised of a computing device and a mapping device. The computing device is configured to use residue number system (RNS) arithmetic operations to respectively determine solutions for two or more polynomial equations. The solutions are iteratively computed and expressed as RNS residue values. The mapping device is configured to determine a series of digits in the weighted number system based on the RNS residue values. The encryptor is coupled to the DSRD and the first chaotic sequence generator. The encryptor is configured to generate a modified data stream by incorporating or combining the series of digits with the input data stream.

According to an aspect of the invention, the mapping device is configured to determine a series of digits in the weighted number system based on the RNS residue values using a Chinese Remainder Theorem process. The mapping device is also configured to identify a number in the weighted number system that is defined by the RNS residue values. The mapping device is further configured to identify a truncated portion of a number in the weighted number system that is defined by the RNS value.

According to another aspect of the invention, the mapping device is configured to select the truncated portion to include any serially arranged set of digits. The set of digits are comprised of a portion of the number in the weighted number system. The mapping device is also configured to select the truncated portion to be exclusive of a most significant digit when all possible weighted numbers represented by P bits are not mapped, i.e. when $M-1<2^P$. P is a fewest number of bits required to achieve a binary representation of the weighted numbers. The most significant digit is comprised of a number in the weighted number system.

According to another aspect of the invention, the computing device is configured to utilize a modulus selected for each polynomial equation so that each polynomial equation is irreducible. The computing device is further configured to utilize a modulus selected for each polynomial equation so that solutions iteratively computed via a feedback mechanism are chaotic. The polynomial equations consist of at least a third-order polynomial equation. The polynomial equations are identical exclusive of a constant value. The polynomial equations are one of a constant or varying function of time.

According to another aspect of the invention, the chaotic sequence generator is further comprised of a feedback mechanism. The feedback mechanism is configured to selectively define a variable "x" of a polynomial equation as a solution computed in a previous iteration.

According to another aspect of the invention, the encryptor includes at least one of a multiplier, an adder, a digital logic device and a feedback mechanism. The encryptor is also configured to perform at least one of a standard multiplication operation, a multiplication in a Galois extension field, an addition modulo q operation, a subtraction modulo q operation and a bitwise logic operation.

According to yet another aspect of the invention, the cryptographic system is comprised of a modified data stream receiving device (MDSRD), a second chaotic sequence generator and a decryptor. The MDSRD is configured to receive the modified data stream communicated to the MSDRD from the encryptor. The second chaotic sequence generator is configured to generate a decryption sequence. The decryption sequence is a chaotic sequence having a time varying value expressed in a digital form that has no discernable regularity or order. The decryption sequence can be the same as the series of digits generated by the first chaotic sequence generator. The decryptor is electronically connected to the MDSRD and the second chaotic sequence generator. The decryptor is configured to generate decrypted data by performing a decryption method utilizing the modified data stream and the decryption sequence. The input data stream can be expressed in the same weighted number system as the series of digits generated by the first chaotic sequence generator.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The present invention concerns a method for generating a chaotic sequence, which can be used in various types of chaos-based cryptographic systems. Such chaos-based cryptographic systems include a chaotic encryption system and a chaotic decryption system. It will be appreciated that each of the foregoing chaos-based cryptographic systems require a chaos generator which is capable of producing a chaotic sequence. A chaotic sequence, as that term is used herein, is a signal sequence having a time varying value expressed in a digital form that has no discernible regularity or order. Those skilled in the art will readily appreciate that the chaotic sequence can be used in a variety of ways, depending on the particular type of chaotic cryptographic system which is desired for implementation.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment or a hardware/software embodiment.

Some embodiments of the present invention provide a method for digitally generating a chaotic sequence. In this regard, it should be appreciated that the presence of any discernible pattern in a chaotic sequence is much more difficult to identify as compared to patterns that emerge over time with a pseudo-random number sequence. As such, a chaotic sequence is characterized by a greater degree of apparent randomness as compared to a conventional pseudo-random number sequence. In this regard, it will be appreciated that a chaotic sequence can advantageously be used in a cryptographic system having a high degree of security feature.

Figure 1:
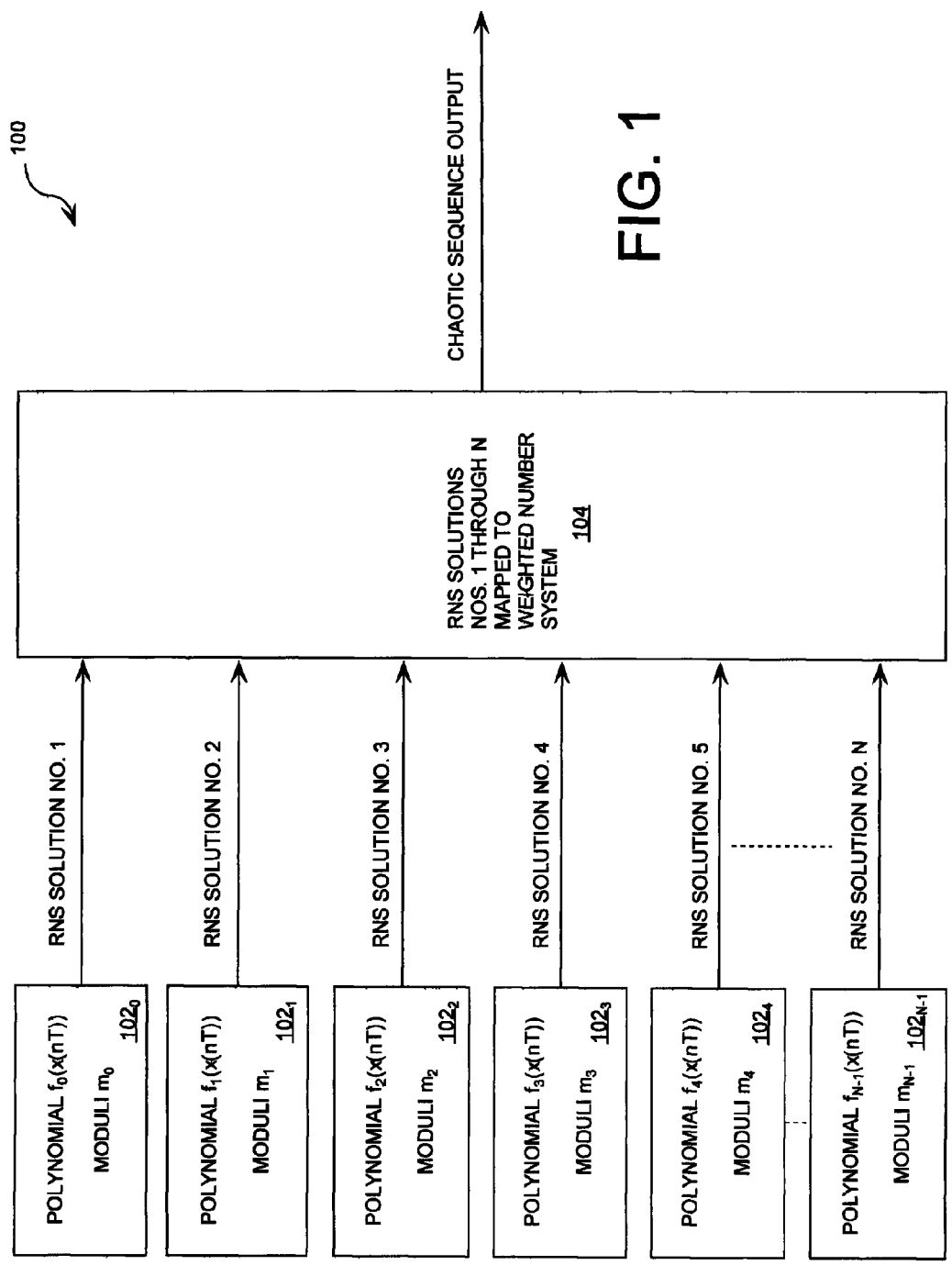
FIG. 1 is a conceptual diagram of a chaotic sequence generation that is useful for understanding the invention.

Referring now to FIG. 1, there is provided a conceptual diagram of a chaotic sequence generator 100 that is useful for understanding the invention. As shown in FIG. 1, generation of the chaotic sequence begins at a processing devices $102_0, \ldots, 102_{N-1}$ where N polynomial equations $f_0(x(nT)), \ldots, f_{N-1}(x(nT))$ are selected. The N polynomial equations $f_0(x(nT)), \ldots, f_{N-1}(x(nT))$ can be selected as the same polynomial equation or as different polynomial equations. According to an aspect of the invention, the N polynomial equations $f_0(x(nT)), \ldots, f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation" as used herein refers to a polynomial equation that cannot be expressed as a product of at least two nontrivial polynomial equations over the same Galois field. For example, the polynomial equation $f(x(nT))$ is irreducible if there does not exist two (2) non-constant polynomial equations $g(x(nT))$ and $h(x(nT))$ in $x(nT)$ with rational coefficients such that $f(x(nT))=g(x(nT)) \cdot h(x(nT))$.

As will be understood by a person skilled in the art, each of the N polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e. modulo operations. Modulo operations are well known to persons skilled in the art. Thus, such operations will not be described in great detail herein. However, it should be appreciated that a RNS residue representation for some weighted value "a" can be defined by mathematical Equation (1).

$$R=\{a \text{ modulo } m_0, a \text{ modulo } m_1, \ldots, a \text{ modulo } m_{N-1}\} \qquad (1)$$

where R is a RNS residue N-tuple value representing a weighted value "a". Further, R(nT) can be a representation of the RNS solution of a polynomial equation $f(x(nT))$ defined as $R(nT)=\{f_0(x(nT)) \text{ modulo } m_0, f_1(x(nT)) \text{ modulo } m_1, \ldots, f_{N-1}(x(nT)) \text{ modulo } m_{N-1}\}$. $m_0, m_1, \ldots, m_{N-1}$ respectively are the moduli for RNS arithmetic operations applicable to each polynomial equation $f_0(x(nT)), \ldots, f_{N-1}(x(nT))$.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, m_{N-1}$. The modulus value chosen for each RNS moduli is preferably selected to be relatively prime numbers $p_1, p_1, \ldots, p_{N-1}$. The phrase "relatively prime numbers" as used herein refers to a collection of natural numbers having no common divisors except one (1). Consequently, each RNS arithmetic operation employed for expressing a solution as an RNS residue value uses a different prime number $p_0, p_1, \ldots, p_{N-1}$ as a moduli $m_0, m_1, \ldots, m_{N-1}$.

Those skilled in the art will appreciate that the RNS residue value calculated as a solution to each one of the polynomial equations $f_0(x(nT)), \ldots, f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots,$ $p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the N polynomial equations $f_0(x(nT)), \ldots, f_{N-1}(x(nT))$ is selected as an irreducible cubic polynomial equation having chaotic properties in Galois field arithmetic. Each of the N polynomial equations $f_0(x(nT)), \ldots, f_{N-1}(x(nT))$ can also be selected to be a constant or varying function of time. The irreducible cubic polynomial equation is defined by a mathematical Equation (2).

$$f(x(nT))=Q(k)x^3(nT)+R(k)x^2(nT)+S(k)x(nT)+C(k,L) \qquad (2)$$

where n is a sample time index value. k is a polynomial time index value. L is a constant component time index value. T is a fixed constant having a value representing a time interval or increment. Q, R, and S are coefficients that define the polynomial equation $f(x(nT))$. C is a coefficient of $x(nT)$ raised to a zero power and is therefore a constant for each polynomial characteristic. In a preferred embodiment, a value of C is selected which empirically is determined to produce an irreducible form of the stated polynomial equation $f(x(nT))$ for a particular prime modulus. For a given polynomial with fixed values for Q, R, and S more than one value of C can exist, each providing a unique iterative sequence. Still, the invention is not limited in this regard.

According to another embodiment of the invention, the N polynomial equations $f_0(x(nT)) \ldots f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation $f(x(nT))$. Such constant values $C_0, C_1, \ldots, C_{N-1}$ and associated modulus $m_0, m_1, \ldots, m_{N-1}$ values which produce an irreducible form of the stated polynomial equation $f(x(nT))$ are listed in the following Table (1).

TABLE 1

| Moduli values $m_0, m_1, \ldots, m_{N-1}$: | Sets of constant values $C_0, C_1, \ldots, C_{N-1}$: |
| --- | --- |
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |

TABLE 1-continued

| Moduli values $m_0, m_1, \ldots, m_{N-1}$: | Sets of constant values $C_0, C_1, \ldots, C_{N-1}$: |
| --- | --- |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, the invention is not limited in this regard.

The number of discrete magnitude states (dynamic range) that can be generated with the system shown in FIG. 1 will depend on the quantity of polynomial equations N and the modulus values $m_0, m_1, \ldots, m_{N-1}$ values selected for the RNS number systems. In particular, this value can be calculated as the product $M = m_0 \cdot m_1 \cdot m_3 \cdot m_4 \cdot \ldots \cdot m_{N-1}$.

Referring again to FIG. 1, it should be appreciated that each of the RNS solutions Nos. 1 through N is expressed in a binary number system representation. As such, each of the RNS solutions Nos. 1 through N is a binary sequence of bits. Each bit of the sequence has a zero (0) value or a one (1) value. Each binary sequence has a bit length selected in accordance with a particular moduli.

According to an embodiment of the invention, each binary sequence representing a residue value has a bit length (BL) defined by a mathematical Equation (3).

$$BL = \text{Ceiling}[\text{Log } 2(m)] \qquad (3)$$

where m is selected as one of moduli $m_0, m_1, \ldots, m_{N-1}$. Ceiling[u] refers to a next highest integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x (nT)), \ldots, f_4(x (nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3,563,762,191,059,523$. The binary number system representation of each RNS solution can be computed using Ceiling[Log 2(3,563,762,191,059,523)]=Ceiling[51.66]=52 bits. Because each polynomial is irreducible, all 3,563,762,191,059,523 possible values are computed resulting in a sequence repetition time of M times T seconds, i.e, a sequence repetition times an interval of time between the computation of each values in the sequence of generated values. Still, the invention is not limited in this regard.

Referring again to FIG. 1, the generation of a chaotic sequence continues with mapping operation performed by a mapping device 104. The mapping operations involve mapping the RNS solutions Nos. 1 through N to a weighted number system representation to form a chaotic sequence output. The phrase "weighted number system" as used herein refers to a number system other than a residue number system. Such weighted number systems include, but are not limited to, an integer number system, a binary number system, an octal number system, and a hexadecimal number system.

According to an aspect of the invention, the RNS solutions Nos. 1 through N are mapped to a weighted number system representation by determining a series of digits in the weighted number system based on the RNS solutions Nos. 1 through N. The term "digit" as used herein refers to a symbol of a combination of symbols to represent a number. For example, a digit can be a particular bit of a binary sequence. According to another aspect of the invention, the RNS solutions Nos. 1 through N are mapped to a weighted number system representation by identifying a number in the weighted number system that is defined by the RNS solutions Nos. 1 through N. According to yet another aspect of the invention, the RNS solutions Nos. 1 through N are mapped to a weighted number system representation by identifying a truncated portion of a number in the weighted number system that is defined by the RNS solutions Nos. 1 through N. The truncated portion can include any serially arranged set of digits of the number in the weighted number system. The truncated portion can also be exclusive of a most significant digit of the number in the weighted number system. The phrase "truncated portion" as used herein refers to a chaotic sequence with one or more digits removed from its beginning and/or ending. The phrase "truncated portion" also refers to a segment including a defined number of digits extracted from a chaotic sequence. The phrase "truncated portion" also refers to a result of a partial mapping of the RNS solutions Nos. 1 through N to a weighted number system representation.

According to an embodiment of the invention, a mixed-radix conversion method is used for mapping RNS solutions Nos. 1 through N to a weighted number system representation. "The mixed-radix conversion procedure to be described here can be implemented in" [modulo moduli only and not modulo the product of moduli.] See *Residue Arithmetic and Its Applications To Computer Technology*, written by Nicholas S. Szabo & Richard I. Tanaka, McGraw-Hill Book Co., New York, 1967. [In a mixed-radix number system,] "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \leq a_i < R_i$. For a given set of radices, the mixed-radix representation of x is denoted by $(a_n, a_{N-1}, \ldots, a_1)$ where the digits are listed order of decreasing significance." See Id. "The multipliers of the digits $a_i$ are the mixed-radix weights where the weight of $a_i$ is $$\prod_{j=1}^{i-1} R_j \text{ for } i \neq 1.\text{" See Id.}$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i.$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1$$

is first taken modulo $m_1$. "Since all terms except the last are multiples of $m_1$, we have $\langle x \rangle = a_1$. Hence, $a_1$ is just the first residue digit." See Id.

"To obtain $a_2$, one first forms $x - a_1$ in its residue code. The quantity $x - a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[x = a_N \prod_{i=1}^{N-1} m_i + \ldots + a_3 m_1 m_2 + a_2 m_1 + a_1\right]$$

shows then that x is $a_2$. In this way, by successive subtracting and dividing in residue notation, all of the mixed-radix digits may be obtained." See Id.

"It is interesting to note that $$a_1 = \langle x \rangle_{m_1}, a_2 = \left\langle \left\lfloor \frac{x}{m_1} \right\rfloor \right\rangle_{m_2},$$

$$a_3 = \left\langle \left\lfloor \frac{x}{m_1 m_2} \right\rfloor \right\rangle_{m_3}$$

and in general for i>1

$$a_i = \left\langle \left\lfloor \frac{x}{m_1 m_2 \ldots m_{i-1}} \right\rfloor \right\rangle_{m_i}."$$

See Id. From the preceding description it is seen that the mixed-radix conversion process is iterative. The conversion can be modified to yield a truncated result. Still, the invention is not limited in this regard.

According to another embodiment of the invention, a Chinese remainder theorem (CRT) arithmetic operation is used to map the RNS solutions Nos. 1 through N to a weighted number system representation. The CRT arithmetic operation is well known in the art and therefore will not be described here in detail. However, a brief discussion of how the CRT is applied may be helpful for understanding the invention. The CRT arithmetic operation can be defined by a mathematical Equation (4).

$$Y = \left\{ \begin{array}{l} \left\langle \langle [3x_0^3((n-1)T) + 3x_0^2((n-1)T) + x_0((n-1)T) + C_0(nT)]b_0 \rangle_{p_0} \frac{M}{p_0} \right\rangle_M + \ldots + \\ \left\langle \langle [3x_{N-1}^3((n-1)T) + 3x_{N-1}^2((n-1)T) + x_{N-1}((n-1)T) + C_{N-1}(nT)]b_{N-1} \rangle_{p_{N-1}} \frac{M}{p_{N-1}} \right\rangle_M \end{array} \right\}_M \quad (4)$$

Mathematical Equation (4) can be re-written as mathematical Equation (5).

$$Y = \left\{ \begin{array}{l} \left\langle [3x_0^3((n-1)T) + 3x_0^2((n-1)T) + x_0((n-1)T) + C_0(nT)]b_0 \right\rangle_{p_0} \frac{M}{p_0} + \ldots + \\ \left\langle [3x_{N-1}^3((n-1)T) + 3x_{N-1}^2((n-1)T) + x_{N-1}((n-1)T) + C_{N-1}(nT)]b_{N-1} \right\rangle_{p_{N-1}} \frac{M}{p_{N-1}} \end{array} \right\}_M \quad (5)$$

where Y is the result of the CRT arithmetic operation. n is a sample time index value. T is a fixed constant having a value representing a time interval or increment. $x_0$-$x_{N-1}$ are RNS solutions Nos. 1 through N. $p_0, p_1, \ldots, p_{N-1}$ are prime number moduli. M is a fixed constant defined by a product of the relatively prime numbers $p_0, p_1, \ldots p_{N-1}$. $b_0, b_1, \ldots, b_{N-1}$ are fixed constants that are chosen as the multiplicative inverses of the product of all other primes modulo $p_0, p_1, \ldots, p_{N-1}$, respectively. Equivalently, $$b_j = \left(\frac{M}{p_j}\right)^{-1} \bmod p_j.$$

The $b_j$'s enable an isomorphic and equal mapping between an RNS N-tuple value representing a weighted number and said weighted number. However without loss of chaotic properties, the mapping need only be unique and isomorphic. As such, a weighted number x can map into a tuple y. The tuple y can map into a weighted number z. The weighted number x is not equal to x as long as all tuples map into unique values for z in a range from zero (0) to M−1. Thus for certain embodiments of the present invention, the $b_j$'s can be defined as $$b_j = \left(\frac{M}{p_j}\right)^{-1} \bmod p_j.$$

In other embodiments of the present invention, all $b_j$'s can be set equal to one or more values without loss of the chaotic properties. Different values of $b_j$ apply a bijective mapping within the RNS, but do not interfere with the CRT combination process.

As should be appreciated, the chaotic sequence output Y can be expressed in a binary number system representation. As such, the chaotic sequence output Y can be represented as a binary sequence. Each bit of the binary sequence has a zero (0) value or a one (1) value. The chaotic sequence output Y can have a maximum bit length (MBL) defined by a mathematical Equation (6).

$$\text{MBL} = \text{Ceiling}[\text{Log } 2(M)] \quad (6)$$

where M is the product of the relatively prime numbers $p_0$, $p_1, \ldots, p_{N-1}$ selected as moduli $m_0, m_1, \ldots, m_{N-1}$. In this regard, it should be appreciated the M represents a dynamic range of a CRT arithmetic operation. The phrase "dynamic range" as used herein refers to a maximum possible range of outcome values of a CRT arithmetic operation. It should also be appreciated that the CRT arithmetic operation generates a chaotic numerical sequence with a periodicity equal to the inverse of the dynamic range M. The dynamic range requires a Ceiling[Log 2(M)] bit precision.

According to an embodiment of the invention, M equals three quadrillion five hundred sixty-three trillion seven hundred sixty-two billion one hundred ninety-one million fifty-nine thousand five hundred twenty-three (3,563,762,191,059, 523). By substituting the value of M into Equation (6), the bit length (BL) for a chaotic sequence output Y expressed in a binary system representation can be calculated as follows: BL=Ceiling/Log 2(3,563,762,191,059,523)=52 bits. As such, the chaotic sequence output Y is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059, 522), inclusive. Still, the invention is not limited in this regard. For example, the chaotic sequence output Y can be a binary sequence representing a truncated portion of a value between zero (0) and M−1. In such a scenario, the chaotic sequence output Y can have a bit length less than Ceiling[Log 2(M)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical Equation (2) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n\cdot 1ms))=3x^3((n-1)\cdot 1ms)+3x^2((n-1)\cdot 1ms)+x((n-1)\cdot 1ms)+8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x into the stated polynomial equation f(x(nT)), a first solution having a value forty-six one (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Figure 2:
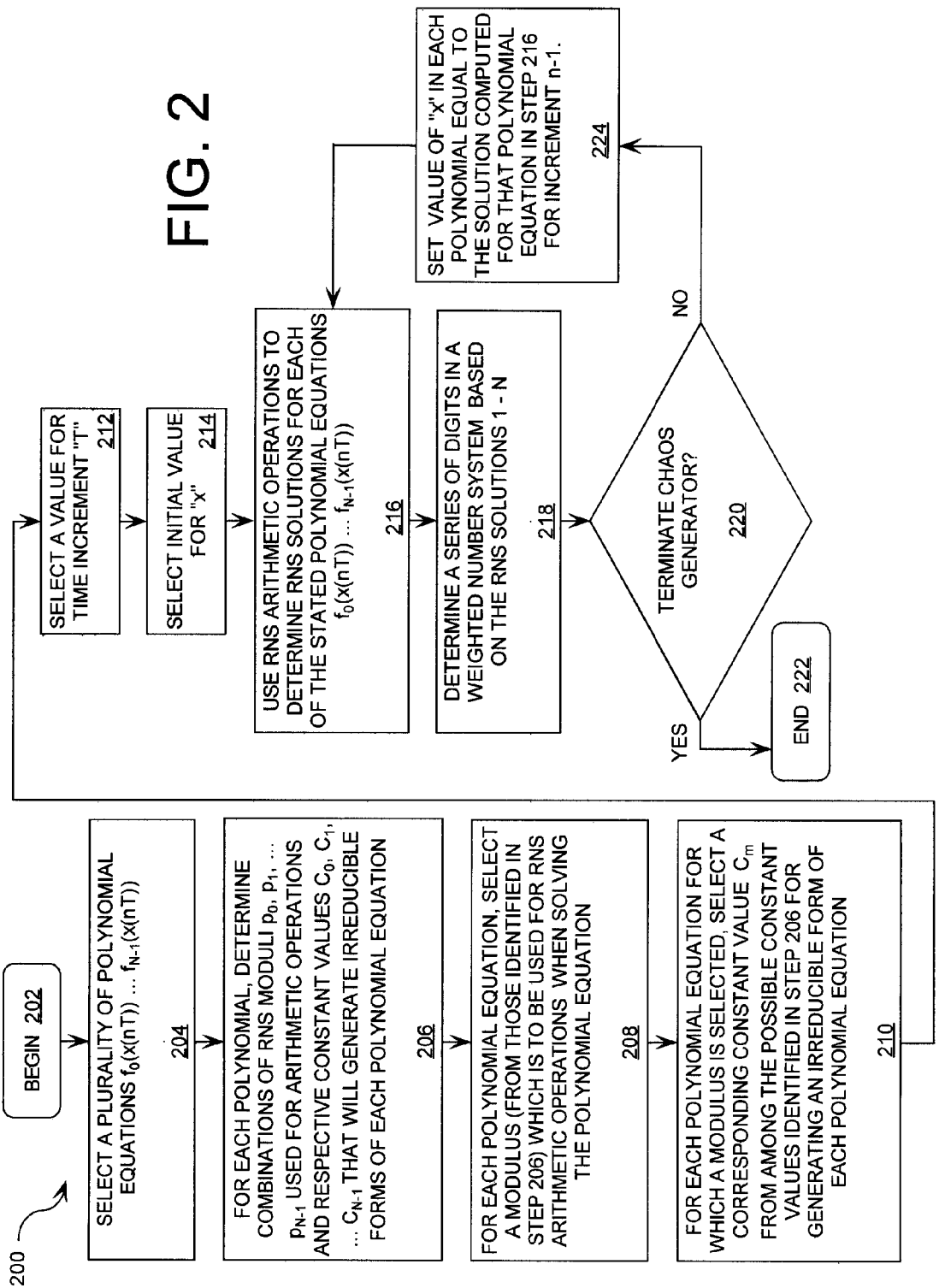
FIG. 2 is a flow diagram of a method for generating a chaotic sequence that is useful for understanding the invention.

Referring now to FIG. 2, there is provided a flow diagram of a method 200 for generating a chaotic sequence that is useful for understanding the invention. As shown in FIG. 2, the method 200 begins with step 202 and continues with step 204. In step 204, a plurality of polynomial equations $f_0(x(nT)), \ldots, f_{N-1}(x(nT))$ are selected. In this regard, it should be appreciated that the polynomial equations $f_0(x(nT)), \ldots, f_{N-1}(x(nT))$ can be selected as the same polynomial equation except for a different constant term or different polynomial equations. After step 204, step 206 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 208, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. In this regard, it should be appreciated that the modulus is selected from the moduli identified in step 206. It should also be appreciated that a different modulus must be selected for each polynomial equation $f_0(x(nT)), \ldots, f_{N-1}(x(nT))$.

As shown in FIG. 2, the method 200 continues with a step 210. In step 210, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 206 for generating an irreducible form of the respective polynomial equation $f_0(x(nT)), \ldots, f_{N-1}(x(nT))$.

After step 210, the method 200 continues with step 212. In step 212, a value for time increment "T" is selected. Thereafter, an initial value for "x" is selected. In this regard, it should be appreciated that the initial value for "x" can be any value allowable in a residue ring. Subsequently, step 216 is performed where RNS arithmetic operations are used to iteratively determine RNS solutions for each of the stated polynomial equations $f_0(x(nT)), \ldots, f_{N-1}(x(nT))$. In step 218, a series of digits in a weighted number system are determined based in the RNS solutions. This step can involve performing a mixed radix arithmetic operation or a CRT arithmetic operation using the RNS solutions to obtain a chaotic sequence output.

After step 218, the method 200 continues with a decision step 220. If a chaos generator is not terminated (220:NO), then step 224 is performed where a value of "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 216. Subsequently, the method 200 returns to step 216. If the chaos generator is terminated (220:YES), then step 222 is performed where the method 200 ends.

A person skilled in the art will appreciate that the method 200 is one architecture of a method for generating a chaotic sequence. However, the invention is not limited in this regard and any other method for generating a chaotic sequence can be used without limitation.

Figure 3:
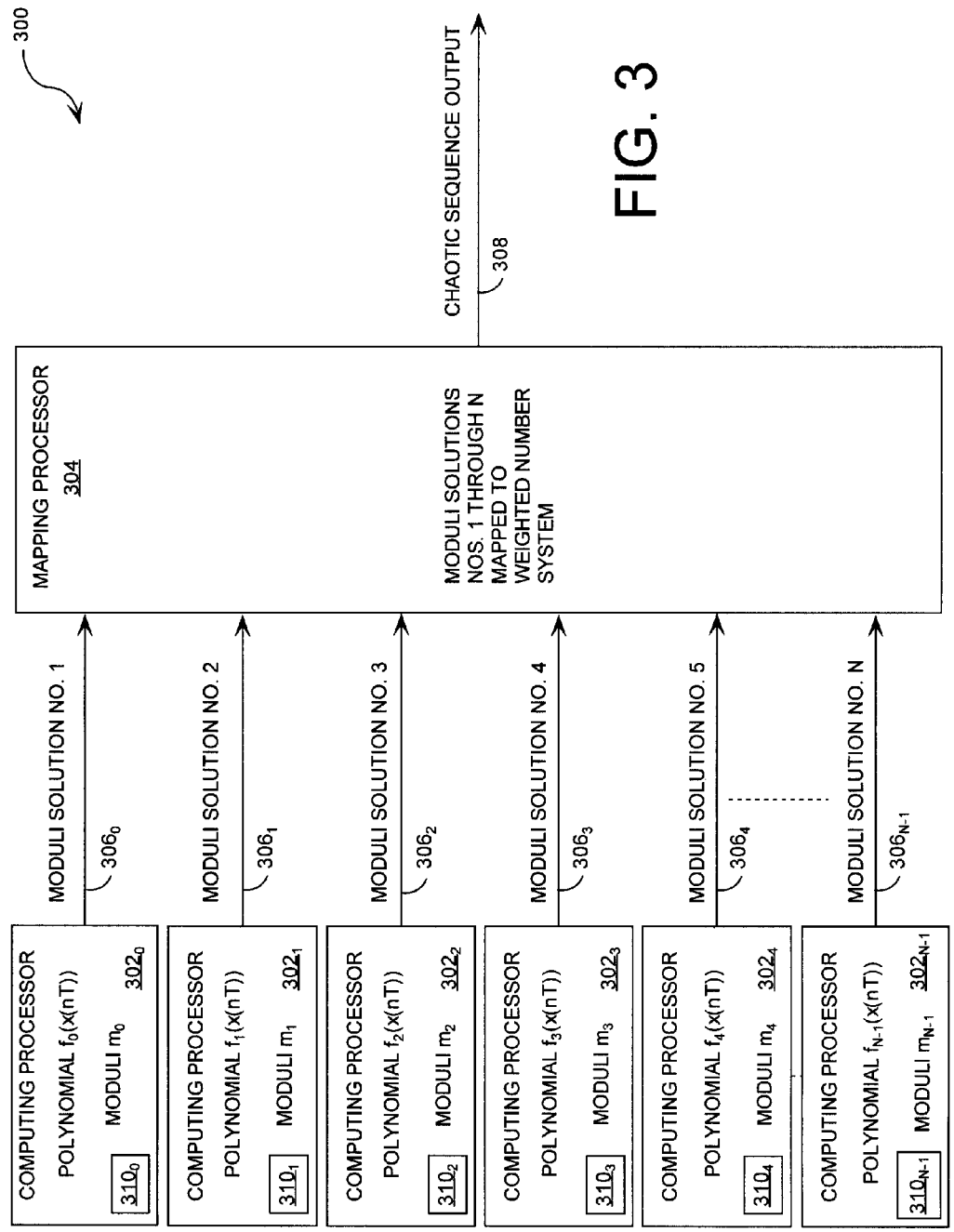
FIG. 3 is a block diagram of a chaotic sequence generator that is useful for understanding the invention.

Referring now to FIG. 3, there is illustrated one embodiment of a chaotic sequence generator 300 which could be used to implement the inventive arrangements. The chaotic sequence generator 300 is comprised of hardware and/or software configured to generate a digital chaotic sequence. In this regard, it should be appreciated that the chaotic sequence generator 300 is comprised of computing processors $302_0$-$302_{N-1}$. The chaotic sequence generator 300 is also comprised of a mapping processor 304. Each computing processor $302_0$-$302_{N-1}$ is coupled to the mapping processor 304 by a respective data bus $306_0$-$306_{N-1}$. As such, each computing processor $302_0$-$302_{N-1}$ is configured to communicate data to the mapping processor 304 via a respective data bus $306_0$-$306_{N-1}$. The mapping processor 304 can be coupled to an external device (not shown) via a data bus 308. In this regard, it should be appreciated that the external device (not shown) includes, but is not limited to, a cryptographic device configured to combine or modify a signal in accordance with a chaotic sequence output.

Referring again to FIG. 3, the computing processors $302_0$-$302_{N-1}$ are comprised of hardware and/or software configured to solve N polynomial equations $f_0(x(nT)), \ldots, f_{N-1}(x(nT))$ to obtain a plurality of solutions. The N polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The N polynomial equations $f_0(x(nT)) \ldots f_{N-1}(x(nT))$ can also be identical exclusive of a constant value. The constant value can be selected so that a polynomial equation $f_0(x(nT)), \ldots, f_{N-1}(x(nT))$ is irreducible for a predefined modulus. The N polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors $302_0$-$302_{N-1}$ employ modulo operations to calculate a respective solution for each polynomial equation $f_0(x(nT)), \ldots, f_{N-1}(x(nT))$ using modulo based arithmetic operations. Each of the computing processors $302_0$-$302_{N-1}$ are comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors $302_0$-$302_{N-1}$ are also comprised of hardware and/or software configured to utilize modulus $m_0$, $m_1$, ..., $m_{N-1}$ selected for each polynomial equation $f_0(x(nT))$, ..., $f_{N-1}(x(nT))$ so that each polynomial equation $f_0(x(nT))$, ..., $f_{N-1}(x(nT))$ is irreducible. The computing processors $302_0$-$302_{N-1}$ are further comprised of hardware and/or software configured to utilize moduli $m_0$, $m_1$, ..., $m_{N-1}$ selected for each polynomial equation $f_0(x(nT))$, ..., $f_{N-1}(x(nT))$ so that solutions iteratively computed via a feedback mechanism $310_0$-$310_{N-1}$ are chaotic. In this regard, it should be appreciated that the feedback mechanisms $310_0$-$310_{N-1}$ are provided so that the solutions for each polynomial equation $f_0(x(nT))$, ..., $f_{N-1}(x(nT))$ can be iteratively computed. Accordingly, the feedback mechanisms $310_0$-$310_{N-1}$ are comprised of hardware and/or software configured to selectively define a variable "x" of a polynomial equation as a solution computed in a previous iteration.

Referring again to FIG. 3, the computing processors $302_0$-$302_{N-1}$ are further comprised of hardware and/or software configured to express each of the RNS residue values in a binary number system representation. In this regard, the computing processors $302_0$-$302_{N-1}$ can employ an RNS-to-binary conversion method. Such methods are generally known to persons skilled in the art and therefore will not be described in great detail herein. However, it should be appreciated that any such method can be used without limitation. It should also be appreciated that the residue values expressed in binary number system representations are hereinafter referred to as moduli solutions Nos. 1 through N comprising the elements of an RNS N-tuple.

According to an embodiment of the invention, the computing processors $302_0$-$302_{N-1}$ are further comprised of memory based tables (not shown) containing pre-computed residue values in a binary number system representation. The address space of each memory table is at least from zero (0) to $m_m$ for all m, $m_0$ through $m_{N-1}$. On each iteration, the table address is used to initiate the sequence. Still, the invention is not limited in this regard.

Referring again to FIG. 3, the mapping processor 304 is comprised of hardware and/or software configured to map the moduli (RNS N-tuple) solutions Nos. 1 through N to a weighted number system representation. The result is a series of digits in the weighted number system based on the moduli solutions Nos. 1 through N. For example, the mapping processor 304 can be comprised of hardware and/or software configured to determine the series of digits in the weighted number system based on the RNS residue values using a Chinese Remainder Theorem process. In this regard, it will be appreciated by those skilled in the art that the mapping processor 304 is comprised of hardware and/or software configured to identify a number in the weighted number system that is defined by the moduli solutions Nos. 1 through N.

According to an aspect of the invention, the mapping processor 304 can be comprised of hardware and/or software configured to identify a truncated portion of a number in the weighted number system that is defined by the moduli solutions Nos. 1 through N. For example, the mapping processor 304 can also be comprised of hardware and/or software configured to select the truncated portion to include any serially arranged set of digits of the number in the weighted number system. Further, the mapping processor 304 can include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. Still, the invention is not limited in this regard.

Referring again to FIG. 3, the mapping processor 304 is comprised of hardware and/or software configured to express a chaotic sequence in a binary number system representation. In this regard, it should be appreciated that the mapping processor 304 can employ a weighted-to-binary conversion method. Such methods are generally known to persons skilled in the art and therefore will not be described in great detail herein. However, it should be appreciated that any such method can be used without limitation.

A person skilled in the art will appreciate that the chaotic generator 300 is one architecture of a chaotic generator. However, the invention is not limited in this regard and any other chaotic generator architecture can be used without limitation.

Figure 4:
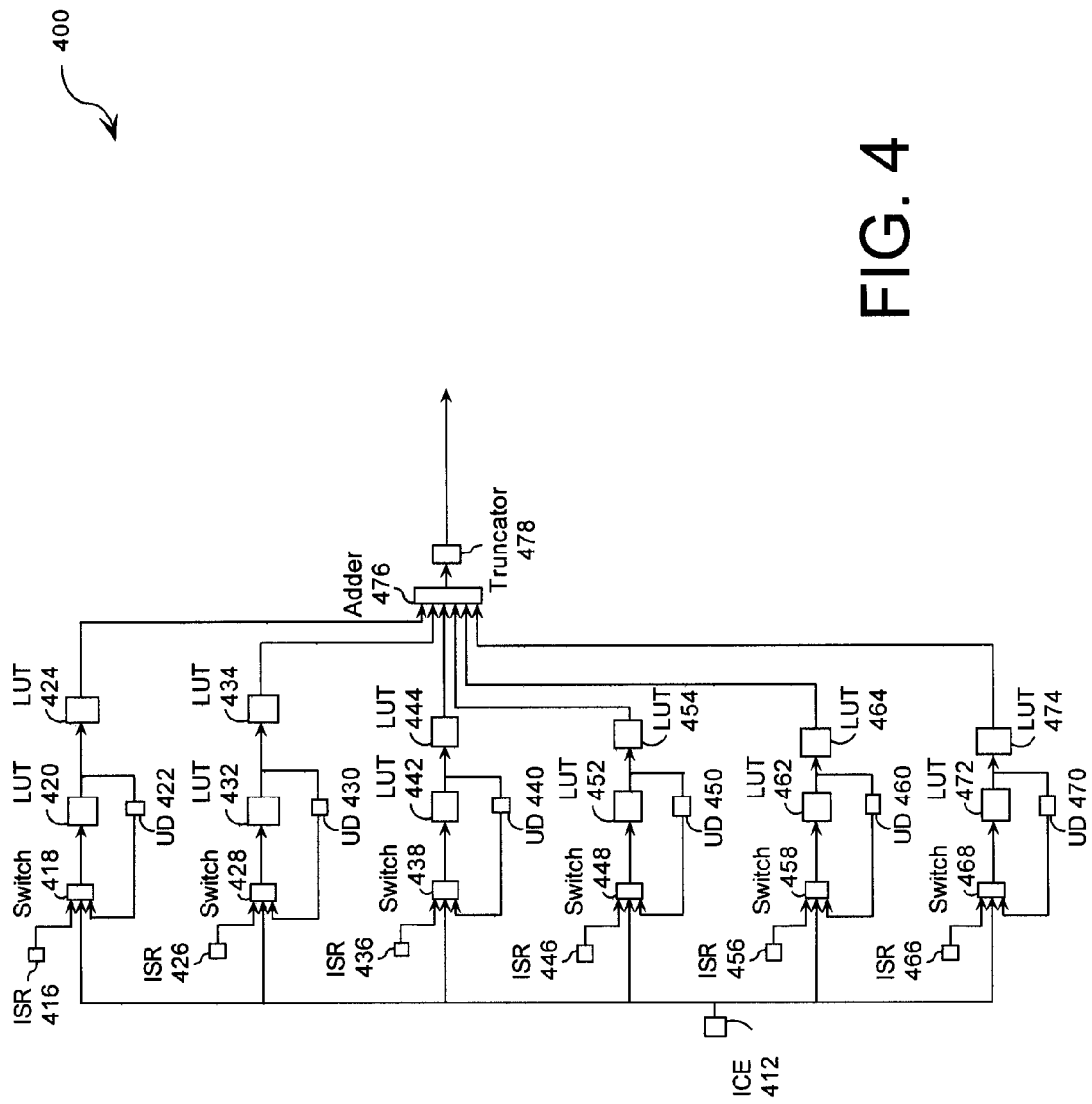
FIG. 4 is a block diagram of a chaotic sequence generator implementing memory based tables that is useful for understanding the invention.

A block diagram of an example chaotic sequence generator 400 implementing memory based tables is provided in FIG. 4. As shown in FIG. 4, the chaotic sequence generator 400 is comprised of an initial condition enable (ICE) 412, initial state registers (ISRs) 416, 426, 436, 446, 456, 466, switches 418, 428, 438, 448, 458, 468, unit delays 422, 430, 440, 450, 460, 470, and lookup tables 420, 424, 432, 434, 442, 444, 452, 454, 462, 464, 472, 474. The chaotic sequence generator 400 is also comprised of an adder 476 and a truncator 478. Each of the listed components 412 through 478 are well known to persons skilled in the art, and therefore will not be described in great detail herein. However, a brief description of the listed components 412 through 478 is provided to assist a reader in understanding the present invention.

Referring again to FIG. 4, each of the ISRs 416, 426, 436, 446, 456, 466 is comprised of hardware and software configured to store a set of initial conditions. The ISRs 416, 426, 436, 446, 456, 466 are also comprised of hardware and software configured to communicate a set of initial conditions to the switches 418, 428, 438, 448, 458, 468, respectively.

The ICE 412 is comprised of hardware and software configured to control the switches 418, 428, 438, 448, 458, 468. In this regard, it should be appreciated that the ICE 412 can generate a high voltage control signal and a low voltage control signal. The ICE 412 can also communicate control signals to the switches 418, 428, 438, 448, 458, 468. The switches 418, 428, 438, 448, 458, 468 are responsive to the control signals received from the ICE 412. For example, if the ICE 412 communicates a high control signal to the switch 418, then the switch 418 creates a path between the ISR 416 and the LUT 420. However, if the ICE 412 communicates a low control signal to the switch 418, then the switch 418 creates a path between the unit delay 422 and the LUT 420.

The unit delays 422, 430, 440, 450, 460, 470 and lookup tables 420, 432, 442, 452, 462, 472 provide feedback mechanisms for iterated computations of irreducible polynomial equations $f_0(x(nT))$, ..., $f_{N-1}(x(nT))$ modulo $m_0$, $m_1$, ..., $m_{N-1}$. In this regard, it should be understood that the lookup tables 420, 432, 442, 452, 462, 472 are comprised of hardware and software configured to perform lookup table operations for computing irreducible polynomial equations $f_0(x(nT))$, ..., $f_{N-1}(x(nT))$ modulo $m_0$, $m_1$, ..., $m_{N-1}$. The lookup tables 420, 432, 442, 452, 462, 472 are also comprised of hardware and software configured to communicate results of the computations to the lookup tables 424, 434, 444, 454, 464, 474, respectively. The lookup tables 424, 434, 444, 454, 464, 474 are comprised of hardware and software configured to perform lookup table operations for mapping the results into a desired weighted number system. The lookup tables 424, 434, 444, 454, 464, 474 are also comprised of hardware and software configured to communicate results expressed in a weighted number system representation to the adder 476.

The adder 476 is comprised of hardware and software configured to perform an addition operation. The addition operation involves combining the results expressed in a weighted number system representation to form a single output. The adder 476 is also comprised of hardware and software configured to communicate the single output to the truncator 478. The truncator 478 is comprised of hardware and software configured to identify a truncated portion of a number in the weighted number system that is defined by the single output of the adder 476. The truncator 478 is also comprised of hardware and software configured to communicate a truncated output to an external device (not shown).

A person skilled in the art will appreciate that the chaotic sequence generator 400 is one architecture of a chaotic sequence generator. However, the invention is not limited in this regard and any other chaotic sequence generator architecture can be used without limitation.

Figure 5:
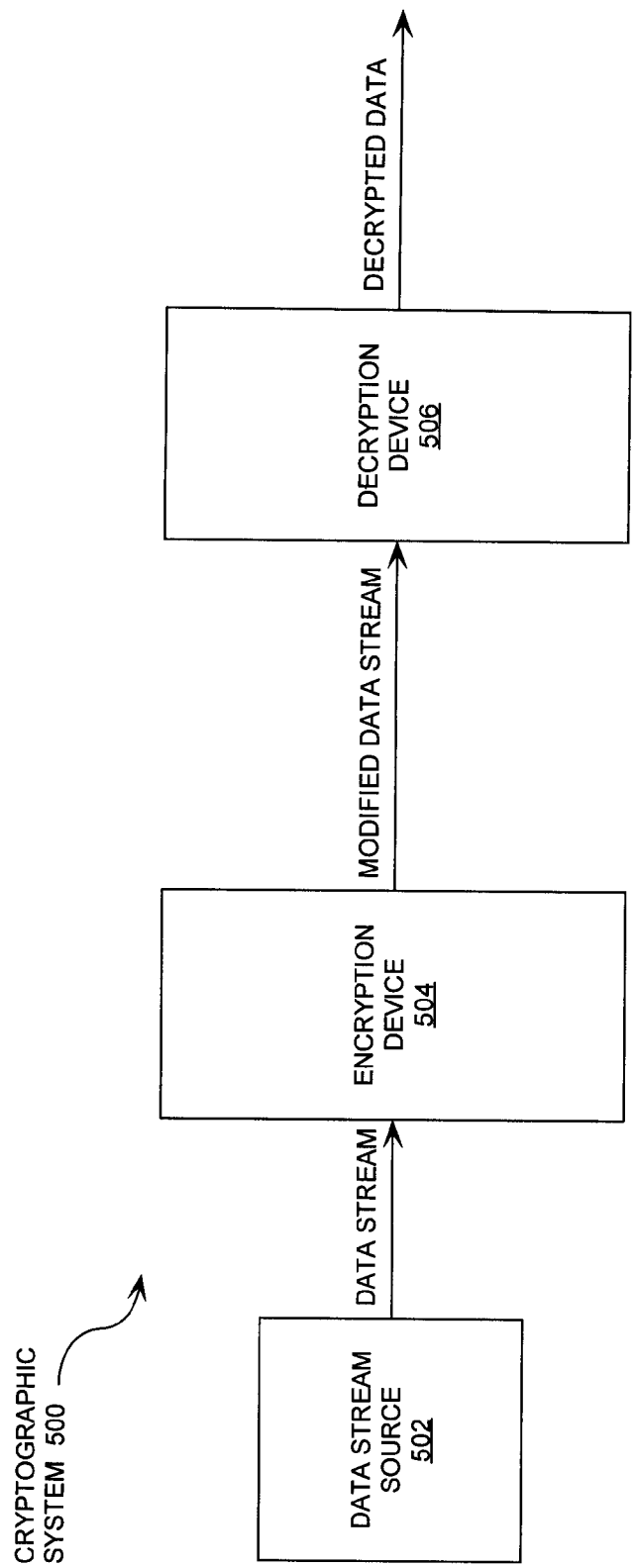
FIG. 5 is a block diagram of a cryptographic system that is useful for understanding the invention.

Referring now to FIG. 5, there is provided a block diagram of a cryptographic system 500, which could be used to implement the inventive arrangements. Notably, the cryptographic system 500 has an increased security feature as compared to conventional cryptographic systems. In this regard, it should be understood that the cryptographic system 500 includes a device to encrypt a data stream utilizing a chaotic sequence. In effect, reverse engineering of mathematical patterns present in an encrypted data stream generated by the cryptographic system 500 is more difficult than reverse engineering of mathematical patterns present in an encrypted data stream generated by a conventional cryptographic system.

Referring again to FIG. 5, the cryptographic system 500 is comprised of a data stream source 502, an encryption device 504 and a decryption device 506. The data stream source 502 can be comprised of hardware and/or software configured to generate a data stream. The data stream can include payload data, such as voice data, video data, user identification data, signature data and/or the like. The data stream can also be a digital data stream. The data stream source 502 is also comprised of hardware and/or software configured to communicate the data stream to the encryption device 504.

The encryption device 504 is comprised of hardware and/or software configured to generate an encryption sequence. The encryption sequence is a chaotic sequence. The chaotic sequence is a sampled data sequence having a time varying value expressed in a digital form that has no discernable regularity or order. The encryption device 504 is also comprised of hardware and/or software configured to perform actions to encrypt (or modify) the data stream using the encryption sequence. The encryption device 504 is further comprised of hardware and/or software configured to communicate a modified data stream to the decryption device 506. The encryption device 504 will be described in greater detail below in relation to FIG. 6.

The decryption device 506 is comprised of hardware and/or software configured to generate a decryption sequence. The decryption sequence is chosen based on the chaotic encryption sequence and the combination device. The decryption sequence may be a chaotic sequence. The chaotic sequence is a sampled data sequence having a time varying value expressed in a digital form that has no discernable regularity or order. The decryption sequence can be the same as the encryption sequence generated by the encryption device 504. The decryption device 506 is also comprised of hardware and/or software configured to perform actions to decrypt the received modified data stream. Such decryption actions are well known to persons skilled in the art, and therefore will not be described in great detail herein. The decryption device 506 is also comprised of hardware and/or software configured to communicate the decrypted data to an external device (not shown). The decryption device 506 will be described in greater detail below in relation to FIG. 7.

Figure 6:
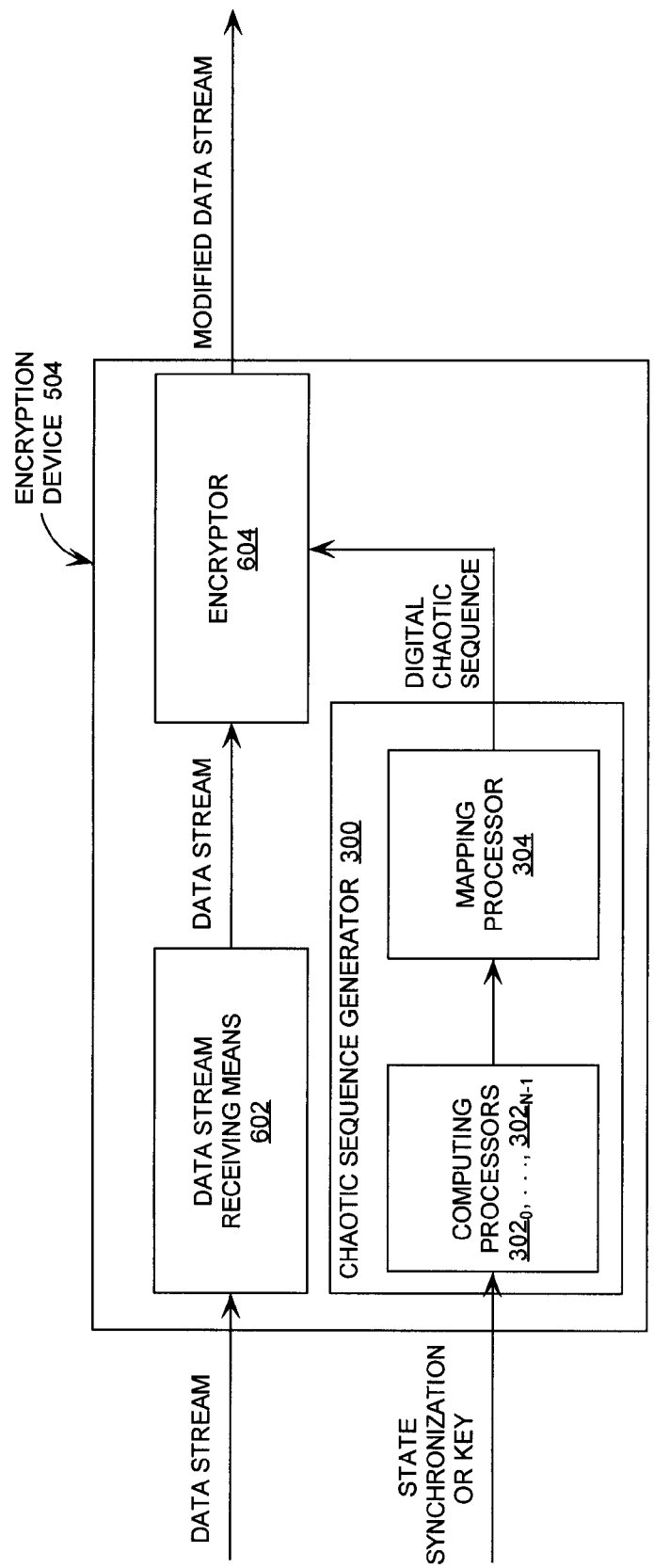
FIG. 6 is a block diagram of the encryption device of FIG. 5 that is useful for understanding the invention.

Referring now to FIG. 6, there is provided a block diagram of the encryption device 504 of FIG. 5. As shown in FIG. 6, the encryption device 504 is comprised of a data stream receiving device (DSRD) 602, an encryptor 604 and a chaotic sequence generator (CSG) 300. Each of the components 602, 604 is well known to persons skilled in the art, and therefore will not be described in great detail herein. However, a brief discussion of the encryption device 504 is provided to assist a reader in understanding the present invention.

Referring again to FIG. 6, the DSRD 602 is configured to receive an input data stream from an external device, such as the data stream source 502 (described above in relation to FIG. 5). The DSRD 602 is also configured to communicate the input data stream to the encryptor 604. The CSG 300 is configured to receive state synchronization information or a key from an external device (not shown). State synchronization information and keys are well known to those skilled in the art, and therefore will not be described in great detail herein. The CSG 300 is also configured to generate an encryption sequence. The encryption sequence is a chaotic sequence having a time varying value expressed in a digital form that has no discernable regularity or order. In this regard, it should be appreciated that the CSG 300 is comprised of a plurality of computing processors $302_0, \ldots, 302_{N-1}$ and a mapping processor 304. The discussion provided above in relation to FIG. 3 is sufficient for understanding the CSG 300.

The CSG 300 is electronically coupled to the encryptor 604. The encryptor 604 is configured to generate a modified data stream by incorporating or combining the encryption sequence with the input data stream. More particularly, the encryptor 604 is configured to perform a combination method for masking the data stream. The combination method may be a standard multiplication, multiplication within a Galois extension field, addition modulo q, subtraction modulo q, bitwise logic operations or any other standard combination method. In this regard, it should be appreciated that the encryptor 604 can include a multiplier, an adder, a digital logic device, a feedback mechanism or a similar combining function device.

A person skilled in the art will appreciate that the encryption device 504 of FIG. 5 illustrates an exemplary architecture of an encryption device implementing the present invention. However, the invention is not limited in this regard and any other encryption device architecture can be used without limitation.

Figure 7:
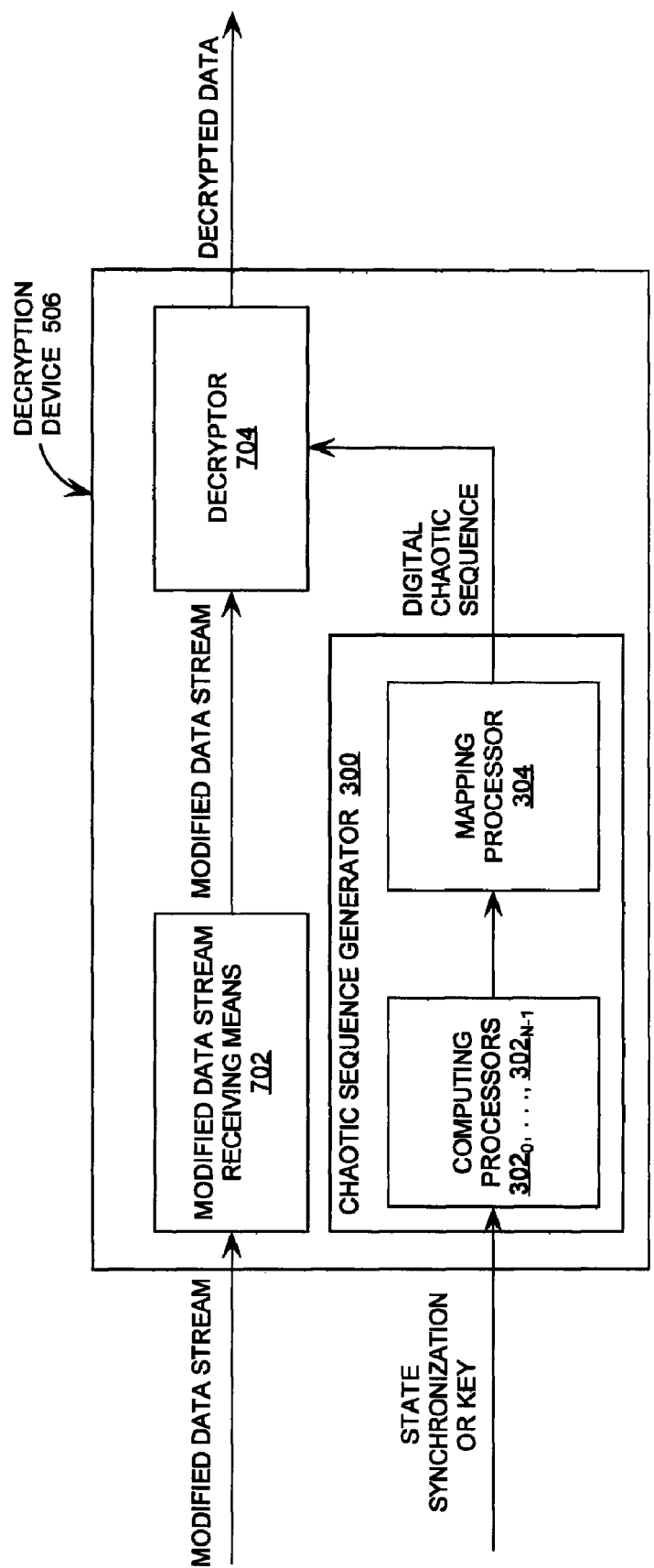
FIG. 7 is a block diagram of the decryption device of FIG. 5 that is useful for understanding the invention.

Referring now to FIG. 7, there is illustrated one embodiment of the decryption device 506 of FIG. 5. The decryption device 506 is comprised of a modified data stream receiving device (MDSRD) 702, a chaotic sequence generator (CSG) 300 and a decryptor 704. Each of the listed components 702, 704 is well known to persons skilled in the art, and therefore will not be described in great detail herein. However, a brief description of the decryption device 506 is provided to assist a reader in understanding the present invention.

Referring again to FIG. 7, the MDSRD 702 is comprised of hardware and/or software configured to receive a modified data stream from an external device, such as the encryption device 504 described above in relation to FIGS. 5-6. The MDSRD 702 is also comprised of hardware and/or software configured to communicate the modified data stream to the decryptor 704. In this regard, it should be appreciated that the MDSRD 702 is electronically connected to the decryptor 704.

The CSG 300 is configured to receive state synchronization information or a key from an external device (not shown). State synchronization information and keys are well known to those skilled in the art, and therefore will not be described in great detail herein. The CSG 300 is also configured to generate a decryption sequence. The decryption sequence is chosen based on the chaotic encryption sequence and the combination method. The decryption sequence may be a chaotic sequence having a time varying value expressed in a digital form that has no discernable regularity or order. In this regard, it should be appreciated that the CSG 300 is comprised of a plurality of computing processors $302_0, \ldots, 302_{N-1}$ and a mapping processor 304. The discussion provided above in relation to FIG. 3 is sufficient for understanding the CSG 300.

The CSG 300 is electronically coupled to the decryptor 704. The decryptor 704 is configured to generate decrypted data by performing a decryption method utilizing the modified data stream and the decryption sequence. Decryption methods are well known to persons skilled in the art, and therefore will not be described in great detail herein.

A person skilled in the art will appreciate that the decryption device 506 illustrates an exemplary architecture of a decryption device implementing the present invention. However, the invention is not limited in this regard and any other decryption device architecture can be used without limitation.

In light of the foregoing description of the invention, it should be recognized that the present invention can be realized in hardware, software, or a combination of hardware and software. A method of generating a chaotic sequence according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A cryptographic system, comprising:
  a data stream receiving device configured for receiving an input data stream;
  a first chaotic sequence generator including: (a) a computing device configured for using residue arithmetic operations to respectively determine a plurality of solutions for a plurality of modular polynomial equations of a third order or higher, where a modulus and a constant zero-power coefficient of each modular polynomial equation are selected such that an irreducible form of a respective modular polynomial equation is generated, said plurality of solutions iteratively computed and expressed as residue values; and (b) a mapping device configured for determining a series of digits in a weighted number system based on said plurality of residue values; and
  an encryptor coupled to said data stream receiving device and said first chaotic sequence generator, said encryptor configured for generating a modified data stream by combining said series of digits with said input data stream.

2. The cryptographic system according to claim 1, wherein said mapping device is further configured to determine a series of digits in said weighted number system based on said plurality of residue values using a Chinese Remainder Theorem process.

3. The cryptographic system according to claim 1, wherein said mapping device is further configured to identify a number in said weighted number system that is defined by said plurality of residue values.

4. The cryptographic system according to claim 1, wherein said mapping device is further configured to identify a truncated portion of a number in said weighted number system that is defined by said plurality of residue values.

5. The cryptographic system according to claim 4, wherein said mapping device is further configured to select said truncated portion to include any serially arranged set of digits comprising a portion of said number in said weighted number system.

6. The cryptographic system according to claim 5, wherein said mapping device is further configured to select said truncated portion exclusive of a most significant digit when all possible weighted numbers represented by P bits, said P is a fewest number of bits required to achieve a binary representation of said weighted numbers.

7. The cryptographic system according to claim 1, wherein said computing device is further configured to utilize a modulus selected for each of said plurality of modular polynomial equations so that each said modular polynomial equation is irreducible.

8. The chaotic sequence generator according to claim 1, wherein said computing device is further configured to utilize a modulus selected for each of said plurality of modular polynomial equations so that solutions iteratively computed via a feedback mechanism for said plurality of modular polynomial equations are chaotic.

9. The cryptographic system according to claim 1, wherein said plurality of modular polynomial equations include at least a cubic type polynomial equation.

10. The cryptographic system according to claim 1, wherein said plurality of modular polynomial equations are identical exclusive of a constant value.

11. The cryptographic system according to claim 1, wherein said plurality of modular polynomial equations are at least one of a constant or varying function of time.

12. The cryptographic system according to claim 1, wherein said first chaotic sequence generator further comprises a feedback mechanism configured to selectively define a variable "x" of a polynomial equation as a solution computed in a previous iteration.

13. The cryptographic system according to claim 1, wherein said encryptor includes at least one of a multiplier, an adder, a digital logic device and a feedback mechanism.

14. The cryptographic system according to claim 1, wherein said encryptor is configured to perform at least one of a standard multiplication operation, a multiplication in a Galois extension field, an addition modulo q operation, a subtraction modulo q operation and a bitwise logic operation.

15. The cryptographic system according to claim 1, further comprising a second chaotic sequence generator configured to generate a decryption sequence, said decryption sequence is a chaotic sequence having a time varying value expressed in a digital form that has no discernable regularity or order.

16. The cryptographic system according to claim 15, further comprising a decryptor electronically connected to said second chaotic sequence generator, said decryptor configured to generate decrypted data by performing a decryption method utilizing said modified data stream and said decryption sequence.

17. The cryptographic system according to claim 1, wherein said input data stream is expressed in the same weighted number system as said series of digits generated by said first chaotic sequence generator.

18. A method for encrypting an input data stream, comprising:
   using, by at least one computing processor, residue arithmetic operations to respectively determine a plurality of solutions for a plurality of modular polynomial equations of a third order or higher, where a modulus and a constant zero-power coefficient of each equation are selected such that an irreducible form of a respective modular polynomial equation is generated, said plurality of solutions iteratively computed and expressed as residue values;
   determining, by said computing processor, a series of digits in a weighted number system based on said plurality of residue values; and
   generating, by an encryption device, a modified data stream by combining said series of digits with said input data stream.

19. The method according to claim 18, wherein said using step further comprises utilizing a modulus selected for each of said plurality of modular polynomial equations so that each said modular polynomial equation is irreducible.

20. The method according to claim 18, wherein said determining step further comprises identifying a number in said weighted number system that is defined by said plurality of residue values.

21. The method according to claim 18, further comprising generating by said computing processor a decryption sequence, wherein said decryption sequence is a chaotic sequence having a time varying value expressed in a digital form that has no discernable regularity or order.

22. The method according to claim 19, further comprising generating by a decryption device decrypted data by performing a decryption method utilizing said modified data stream and said decryption sequence.

23. A device comprising a non-transitory computer readable medium, having stored thereon a computer program for generating a chaotic numerical sequence, the computer program having a plurality of code sections, the code sections executable by a computer to cause the computer to perform the steps of:
   determining a plurality of solutions for a plurality of modular polynomial equations of a third order or higher using residue arithmetic operations, where a modulus and a constant zero-power coefficient of each modular polynomial equation are selected such that an irreducible form of a respective modular polynomial equation is generated, said plurality of solutions iteratively computed and expressed as residue values;
   determining a series of digits in a weighted number system based on said plurality of residue values; and
   generating a modified data stream by combining said series of digits with said input data stream.

24. The device according to claim 23, further comprising code sections for causing said computer to generate a decryption sequence, wherein said decryption sequence is a chaotic sequence having a time varying value expressed in a digital form that has no discernable regularity or order.

25. The device according to claim 24, further comprising code sections for causing said computer to generate decrypted data by performing a decryption method utilizing said modified data stream and said decryption sequence.

* * * * *